US012798575B2

(12) United States Patent
Yamaguchi

(10) Patent No.: US 12,798,575 B2
(45) Date of Patent: Nov. 17, 2026

(54) VEHICLE ACCELERATION CONTROL DEVICE AND METHOD

(71) Applicant: TOYOTA JIDOSHA KABUSHIKI KAISHA, Toyota (JP)

(72) Inventor: Teruya Yamaguchi, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 18/901,096

(22) Filed: Sep. 30, 2024

(65) Prior Publication Data

US 2025/0162583 A1 May 22, 2025

(30) Foreign Application Priority Data

Nov. 21, 2023 (JP) ................................ 2023-197598

(51) Int. Cl.

| | |
|---|---|
| ***B60W 30/14*** | (2006.01) |
| ***B60W 10/18*** | (2012.01) |
| ***B60W 10/20*** | (2006.01) |

(52) U.S. Cl.

CPC ........... *B60W 30/143* (2013.01); *B60W 10/18* (2013.01); *B60W 10/20* (2013.01); *B60W 2540/10* (2013.01); *B60W 2540/12* (2013.01)

(58) Field of Classification Search

CPC ........... B60W 30/143; B60W 2540/10; B60W 2520/105; B60W 2720/106

See application file for complete search history.

(56) References Cited

U.S. PATENT DOCUMENTS

| | | | | |
|---|---|---|---|---|
| 2008/0140283 A1 | 6/2008 | Kuwahara et al. | | |
| 2020/0148189 A1* | 5/2020 | Song | .................. | B60W 40/105 |
| 2021/0300365 A1* | 9/2021 | McCormick | ........... | B60K 35/28 |

FOREIGN PATENT DOCUMENTS

| | | | |
|---|---|---|---|
| JP | 2007-120352 A | | 5/2007 |
| JP | 2009269517 A | * | 11/2009 |

OTHER PUBLICATIONS

JP2009269517A English translation (Year: 2009).*

* cited by examiner

*Primary Examiner* — James J Lee
*Assistant Examiner* — Brandon S Lee
(74) *Attorney, Agent, or Firm* — Oliff PLC

(57) ABSTRACT

Processing circuitry calculates a corrected acceleration by correcting a second requested acceleration. One of a first requested acceleration and the corrected acceleration is selected as an arbitration result. The arbitration result is output to a control circuit for controlling an actuator of a vehicle. If the first requested acceleration has been selected as the arbitration result when the corrected acceleration is calculated, the processing circuitry calculates the corrected acceleration such that the corrected acceleration is closer to the selected first requested acceleration than the corrected acceleration obtained when the selected first requested acceleration is obtained.

19 Claims, 4 Drawing Sheets

Fig.4(a)
Fig. 4(b)
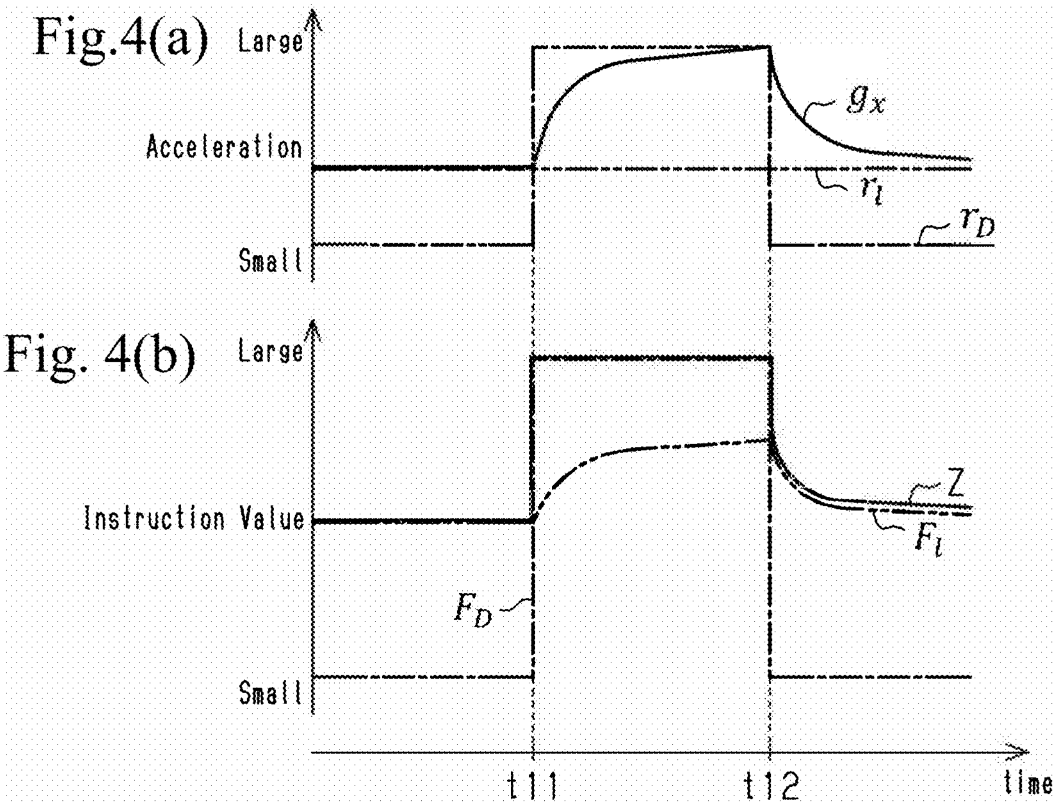
Fig.5(a)
Fig.5(b)
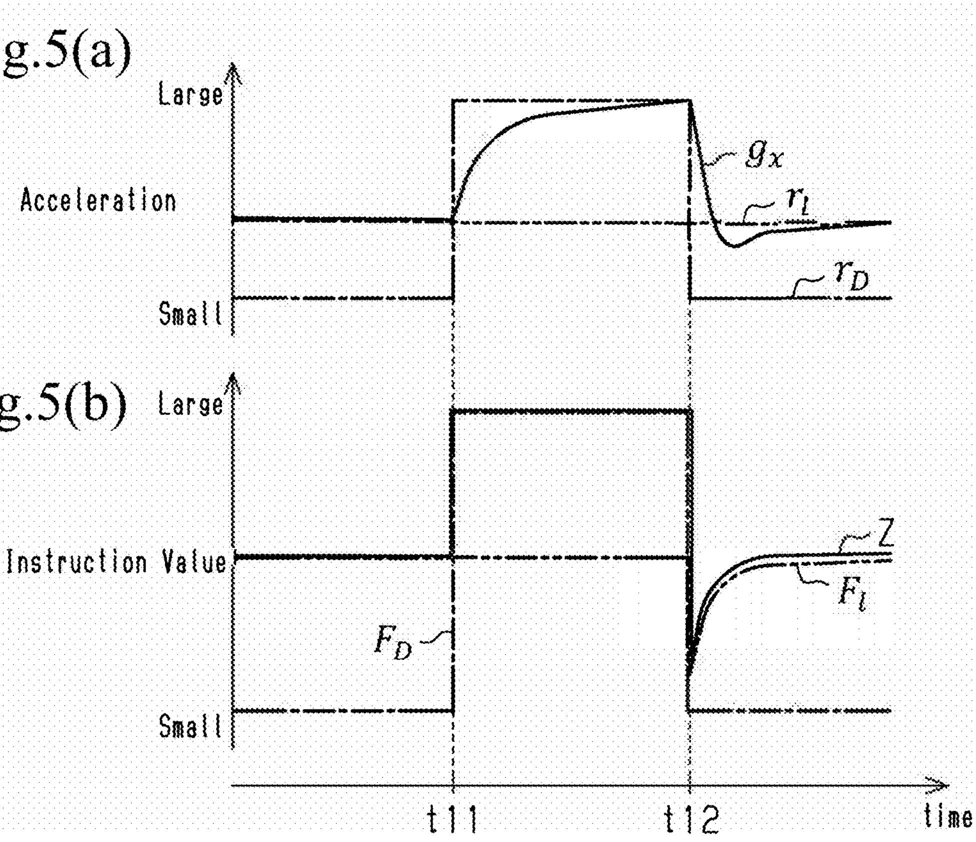

VEHICLE ACCELERATION CONTROL DEVICE AND METHOD

CROSS-REFERENCE TO RELATED APPLICATIONS

This application is based upon and claims the benefit of priority from prior Japanese Patent Application No. 2023-197598, filed on Nov. 21, 2023, the entire contents of which are incorporated herein by reference.

BACKGROUND

1. Field

The present disclosure relates to an information processing device, an information processing method, and a storage medium

2. Description of Related Art

The vehicle disclosed in Japanese Laid-Open Patent Publication No. 2007-120352 includes an information processing device, a driver-assistance device, a controller, and an engine. The engine is a drive source of the vehicle. The information processing device receives a first requested driving force for performing driver assistance from the driver-assistance device. The information processing device receives a second requested driving force corresponding to an operation amount of an accelerator pedal by the driver of the vehicle, separately from the first requested driving force from the driver-assistance device. Subsequently, the information processing device selects one of the received first requested driving force and second requested driving force as an arbitration result. The information processing device outputs the arbitration result to the controller. The controller calculates an engine controlled variable according to the arbitration result. The controller controls the engine in accordance with the calculated controlled variable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information processing device includes processing circuitry that is configured to execute obtaining a first requested acceleration of a vehicle, obtaining a second requested acceleration different from the first requested acceleration, calculating a corrected acceleration by correcting the second requested acceleration, selecting one of the first requested acceleration and the corrected acceleration as an arbitration result, and outputting the arbitration result to a control circuit for controlling an actuator of the vehicle. The processing circuitry is configured to, if the first requested acceleration has been selected as the arbitration result when the corrected acceleration is calculated, calculate the corrected acceleration such that the corrected acceleration is closer to the selected first requested acceleration than the corrected acceleration obtained when the selected first requested acceleration is obtained.

In another general aspect, a non-transitory computer-readable storage medium stores a program for causing processing circuitry to perform information processing. The information processing includes obtaining a first requested acceleration of a vehicle, obtaining a second requested acceleration different from the first requested acceleration, calculating a corrected acceleration by correcting the second requested acceleration, selecting one of the first requested acceleration and the corrected acceleration as an arbitration result, and outputting the arbitration result to a control circuit for controlling an actuator of the vehicle. If the first requested acceleration has been selected as the arbitration result when the corrected acceleration is calculated, the corrected acceleration is calculated such that the corrected acceleration is closer to the selected first requested acceleration than the corrected acceleration obtained when the selected first requested acceleration is obtained.

In still another aspect of the present disclosure, an information processing method including multiple processes similar to the above-described processes.

In the above-described configuration, for example, when the first requested acceleration has been selected as the arbitration result, the control circuit calculates the controlled variable in accordance with the first requested acceleration. Therefore, the actual acceleration changes in accordance with the first requested acceleration. For example, when the arbitration result is switched from the first requested acceleration to the corrected acceleration, the control circuit calculates the controlled variable in accordance with the corrected acceleration. According to the above-described configuration, the corrected acceleration when the first requested acceleration is selected as the arbitration result is calculated such that the absolute value of the difference between the first requested acceleration and the corrected acceleration decreases. Therefore, the above-described configuration achieves the following advantages, unlike, for example, a configuration in which the corrected acceleration is maintained at a constant value when the first requested acceleration is selected as the arbitration result. When the arbitration result is switched from the first requested acceleration to the corrected acceleration, the controlled variable is prevented from changing abruptly. This prevents the actual acceleration of the vehicle from changing abruptly.

In the vehicle disclosed in the above-described document, the requested driving force selected by the information processing device as the arbitration result may be switched from one of the first requested driving force and the second requested driving force to the other. At this time, if there is a difference between the first requested driving force and the second requested driving force before and after the switching, the engine controlled variable, which has been calculated by the controller, may change abruptly. As a result, in a general vehicle, the actual acceleration of the vehicle may change abruptly due to the switching of the arbitration result. The above-described configuration, method, or storage medium improves this situation.

Other features and aspects will be apparent from the following detailed description, the drawings, and the claims.

BRIEF DESCRIPTION OF THE DRAWINGS

FIG. 4 (*a*) and FIG. 4 (*b*) is a timing diagram of the arbitration control of the present embodiment shown in FIG.

Figure 1:
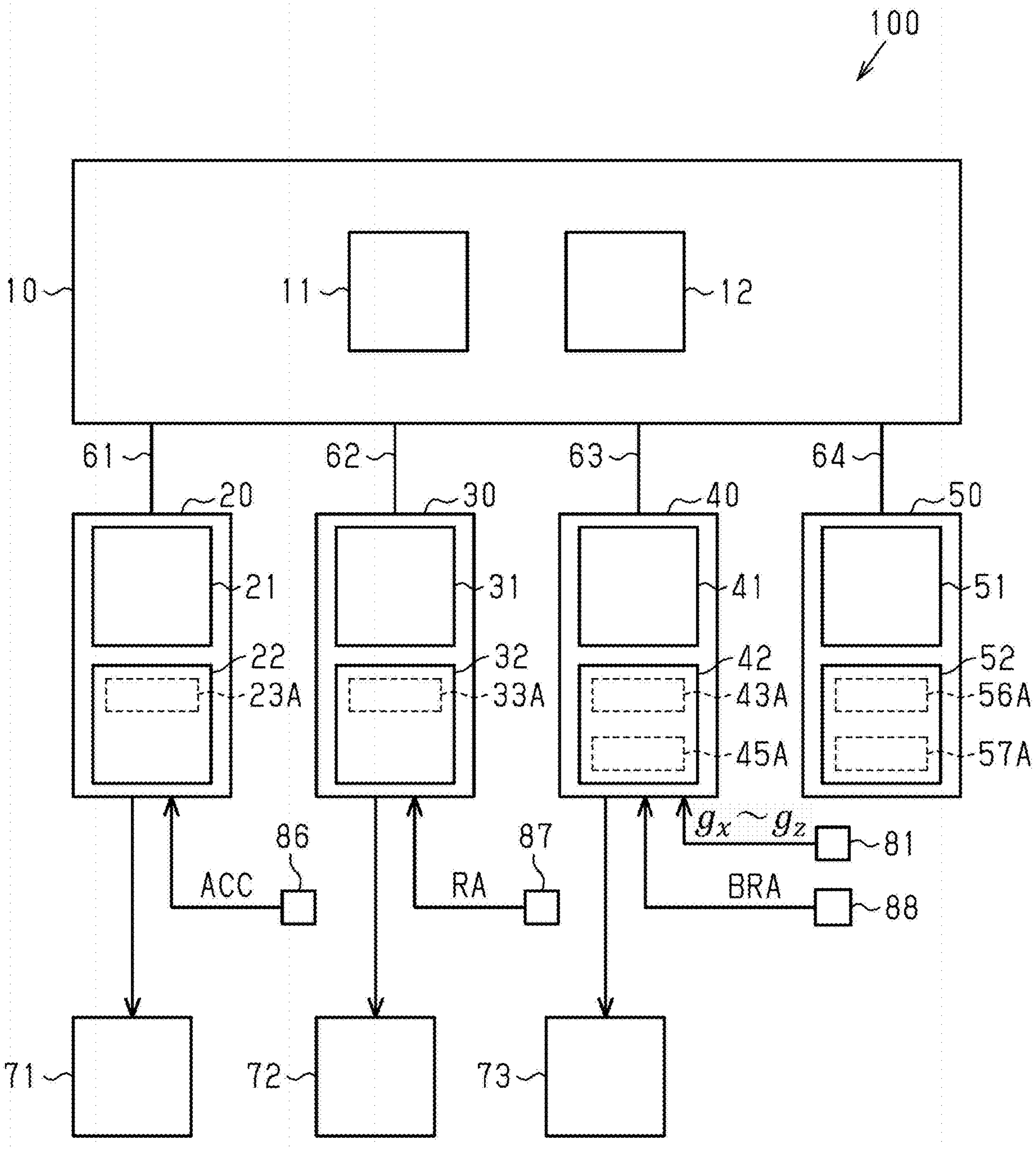
FIG. 1 is a schematic diagram showing the configuration of a vehicle.

3, FIG. 4 (*a*) shows changes in acceleration, and FIG. 4 (*b*) shows changes in an instruction value.

FIG. 5 (*a*) and FIG. 5 (*b*) is a timing diagram of a comparative example, FIG. 5 (*a*) shows changes in acceleration, and FIG. 5 (*b*) shows changes in an instruction value.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Schematic Structure of Vehicle

An embodiment of the present invention will be described below with reference to FIGS. 1 to 5. First, a schematic configuration of a vehicle 100 will be described.

As shown in FIG. 1, the vehicle 100 includes a power train device 71, a steering device 72, and a brake device 73. In the present embodiment, each of the power train device 71, the steering device 72, and the brake device 73 is an actuator of the vehicle 100.

The power train device 71 includes an engine, a motor generator, a transmission, and the like. The engine is configured to apply a driving force to driving wheels of the vehicle 100 via a transmission. The motor generator can apply a driving force to driving wheels of the vehicle 100 via a transmission.

An example of the steering device 72 is a rack-and-pinion electric steering device. The steering device 72 is configured to change the direction of steered wheels of the vehicle 100 by controlling a rack and a pinion (not shown).

The brake device 73 is a so-called mechanical brake device that mechanically brakes the wheels of the vehicle 100. In the present embodiment, an example of the brake device 73 is a disc brake.

As shown in FIG. 1, the vehicle 100 includes a central ECU 10, a power train ECU 20, a steering ECU 30, a brake ECU 40, and an advanced driver-assistance ECU 50. The vehicle 100 includes a first external bus 61, a second external bus 62, a third external bus 63, and a fourth external bus 64. "ECU" is an abbreviation for Electronic Control Unit.

The central ECU 10 centrally controls the entire vehicle 100. The central ECU 10 includes an execution device 11 and a storage device 12. An example of the execution device 11 is a CPU. The storage device 12 includes a read-only ROM, a readable and writable volatile RAM, and a readable and writable nonvolatile storage. The storage device 12 stores various programs and various data in advance. The execution device 11 realizes various processes by executing a program stored in the storage device 12.

The power train ECU 20 can communicate with the central ECU 10 via the first external bus 61. The power train ECU 20 controls the power train device 71 by outputting a control signal to the power train device 71. The power train ECU 20 includes an execution device 21 and a storage device 22. An example of the execution device 21 is a CPU. The storage device 22 includes a ROM, a RAM, and a storage. The storage device 22 stores various programs and various data in advance. To be specific, the storage device 22 stores in advance a power train application 23A as one of the various programs. The power train application 23A is application software for controlling the power train device 71. The execution device 21 realizes a function as a power train control unit 23 to be described later by executing the power train application 23A stored in the storage device 22. In the present embodiment, the power train ECU 20 is a controller as a control circuit for controlling the power train device 71.

The steering ECU 30 is in communication with the central ECU 10 via a second external bus 62. The steering ECU 30 controls the steering device 72 by outputting a control signal to the steering device 72. The steering ECU 30 includes an execution device 31 and a storage device 32. An example of the execution device 31 is a CPU. The storage device 32 includes a ROM, a RAM, and a storage. The storage device 32 stores various programs and various data in advance. To be specific, the storage device 32 stores a steering application 33A in advance as one of the various programs. The steering application 33A is application software for controlling the steering device 72. The execution device 31 realizes a function as a steering control unit 33 described later by executing the steering application 33A stored in the storage device 32. In the present embodiment, the steering ECU 30 is a controller as a control circuit for controlling the steering device 72.

The brake ECU 40 can communicate with the central ECU 10 via the third external bus 63. The brake ECU 40 controls the brake device 73 by outputting a control signal to the brake device 73. The brake ECU 40 includes an execution device 41 and a storage device 42. An example of the execution device 41 is a CPU. The storage device 42 includes a ROM, a RAM, and a storage. The storage device 42 stores various programs and various data in advance. To be specific, the storage device 42 stores in advance a brake application 43A as one of the various programs. The brake application 43A is application software for controlling the brake device 73. Further, the storage device 42 stores a motion manager application 45A in advance as one of the various programs. The motion manager application 45A is application software for arbitrating multiple requested motion amounts. The execution device 41 executes the brake application 43A stored in the storage device 42 to realize a function as a brake control unit 43 to be described later. The execution device 41 executes the motion manager application 45A stored in the storage device 42 to realize a function as a motion manager 45 to be described later. In the present embodiment, the brake ECU 40 is an information processing device including processing circuitry. The motion manager application 45A is an information-processing program. The storage device 42 is a non-transitory computer-readable storage medium that stores a program. That is, the execution device 41 of the brake ECU 40 executes various processes in the information process method by executing the motion manager application 45A. Further, the brake ECU 40 is a controller as a control circuit for controlling the brake device 73.

The advanced driver-assistance ECU 50 can communicate with the central ECU 10 via the fourth external bus 64. The advanced driver-assistance ECU 50 performs various types of driving assistance. The advanced driver-assistance ECU 50 includes an execution device 51 and a storage device 52. An example of the execution device 51 is a CPU. The storage device 52 includes a ROM, a RAM, and a storage. The storage device 52 stores various programs and various data in advance. The various programs include a first assistance application 56A and a second assistance application 57A. An example of the first assistance application 56A is application software for a so-called speed limiter that limits the upper limit value of the speed of the vehicle 100. In other words, an example of the first assistance application 56A is application software for limiting the upper limit of the acceleration of the vehicle 100. An example of the second assistance application 57A is application software for so-called adaptive cruise control (ACC). The ACC causes the vehicle 100 to follow a preceding vehicle traveling ahead of the vehicle 100 while maintaining a constant inter-vehicle distance between the preceding vehicle and the vehicle 100. In other words, an example of the second assistance application 57A is application software for limiting the lower limit value of the acceleration of the vehicle 100. The execution device 51 executes the first assistance application 56A stored in the storage device 52 to realize a function as a first assistance unit 56 to be described later. The execution device 51 realizes a function as a second assistance unit 57 to be described later by executing the second assistance application 57A stored in the storage device 52.

As shown in FIG. 1, the vehicle 100 includes an acceleration sensor 81, an accelerator operation amount sensor 86, a steering angle sensor 87, and a brake operation amount sensor 88.

The acceleration sensor 81 is a so-called three axis sensor. That is, the acceleration sensor 81 can detect a longitudinal acceleration $g_x$, a lateral acceleration $g_y$, and a vertical acceleration $g_z$. The longitudinal acceleration $g_x$ is an acceleration along the longitudinal axis, or the front-rear axis, of the vehicle 100. The lateral acceleration $g_y$ is an acceleration along the lateral axis, or the left-right axis, of the vehicle 100. The vertical acceleration $g_z$ is an acceleration along the vertical axis, or the up-down axis, of the vehicle 100. The terms front, rear, left, right, up, and down as used herein refer to directions as viewed from a driver's seat of the vehicle 100.

The accelerator operation amount sensor 86 detects an accelerator operation amount ACC which is an operation amount of an accelerator pedal operated by the driver. The steering angle sensor 87 detects a steering angle RA which is an angular position of a steering shaft operated by the driver. The brake operation amount sensor 88 detects a brake operation amount BRA which is an operation amount of a brake pedal operated by the driver.

The power train ECU 20 obtains a signal indicating the accelerator operation amount ACC from the accelerator operation amount sensor 86. The steering ECU 30 obtains a signal indicating the steering angle RA from the steering angle sensor 87. The brake ECU 40 obtains signals indicating the longitudinal acceleration $g_x$, the lateral acceleration $g_y$, and the vertical acceleration g from the acceleration sensor 81. The brake ECU 40 obtains a signal indicating the brake operation amount BRA from the brake operation amount sensor 88. The brake ECU 40 can obtain various values including an accelerator operation amount ACC and a steering angle RA via the central ECU 10.

Peripheral Configuration of Motion Manager

Figure 2:
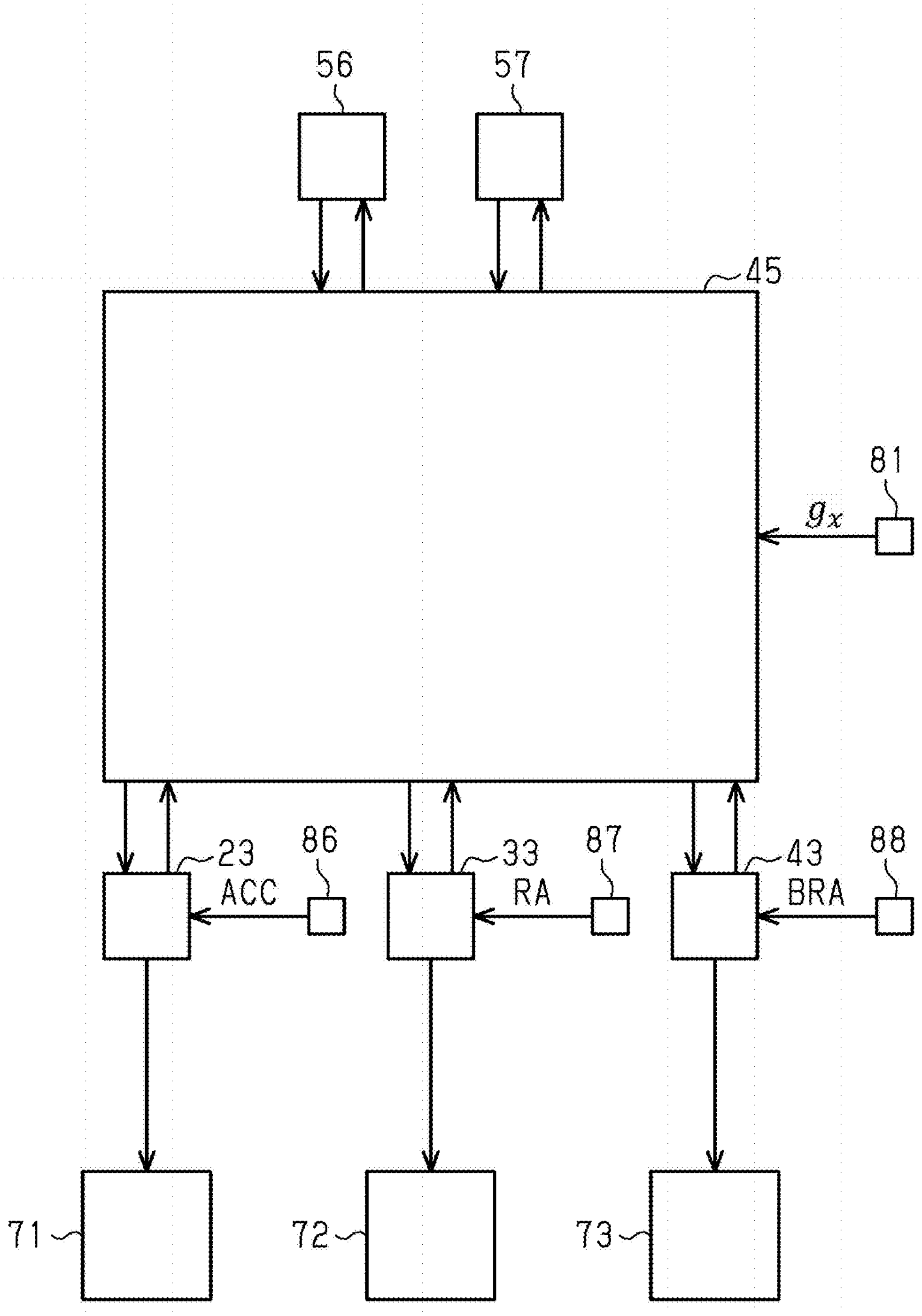
FIG. 2 is a functional block diagram of a peripheral configuration of a motion manager in the vehicle shown in FIG. 1.

Next, the peripheral configuration of the motion manager 45 will be described with reference to FIG. 2. As shown in FIG. 2, the motion manager 45 can communicate with the first assistance unit 56 and the second assistance unit 57. The motion manager 45 can communicate with the power train control unit 23, the steering control unit 33, and the brake control unit 43. Further, the motion manager 45 can obtain a longitudinal acceleration $g_x$ and the like. In the present embodiment, the longitudinal acceleration $g_x$ is an example of the actual acceleration of the vehicle 100. The motion manager 45 can obtain the accelerator operation amount ACC, the steering angle RA, and the brake operation amount BRA via the power train control unit 23, the steering control unit 33, and the brake control unit 43. The power train control unit 23 calculates a controlled variable of the power train device 71. The power train control unit 23 controls the power train device 71 by outputting a control signal corresponding to the calculated controlled variable to the power train device 71. Similarly to the above description, the steering control unit 33 controls the steering device 72. Similarly, the brake control unit 43 controls the brake device 73.

Arbitration Control

Next, the arbitration control executed by the motion manager 45 will be described with reference to FIG. 3. Hereinafter, as an example of the arbitration control, the arbitration control for controlling the power train device 71 will be described. In the arbitration control, the motion manager 45 receives multiple requested motion amounts and arbitrates the multiple requested motion amounts to control the vehicle 100. The multiple requested motion amounts include the first assistance acceleration $r_u$ from the first assistance unit 56, the second assistance acceleration $r_l$ from the second assistance unit 57, and the accelerator operation amount ACC. The first assistance acceleration $r_u$ is a requested value of acceleration along the front-rear axis, or the longitudinal axis, of the vehicle 100. The second assistance acceleration $r_l$ is a requested value of the acceleration along the longitudinal axis of the vehicle 100. Each of the first assistance acceleration $r_u$ and the second assistance acceleration $r_l$ is an example of a second requested acceleration. In the present embodiment, the motion manager 45 executes, as part of the arbitration control, so-called PI control, which is feedback control based on the difference between the first assistance acceleration $r_u$ and the longitudinal acceleration $g_x$, and an integrated value of the difference. The motion manager 45 executes, as a part of the arbitration control, so-called PI control which is feedback control based on a difference between the second assistance acceleration $r_l$ and the longitudinal acceleration $g_x$ and an integrated value of the difference.

Figure 3:
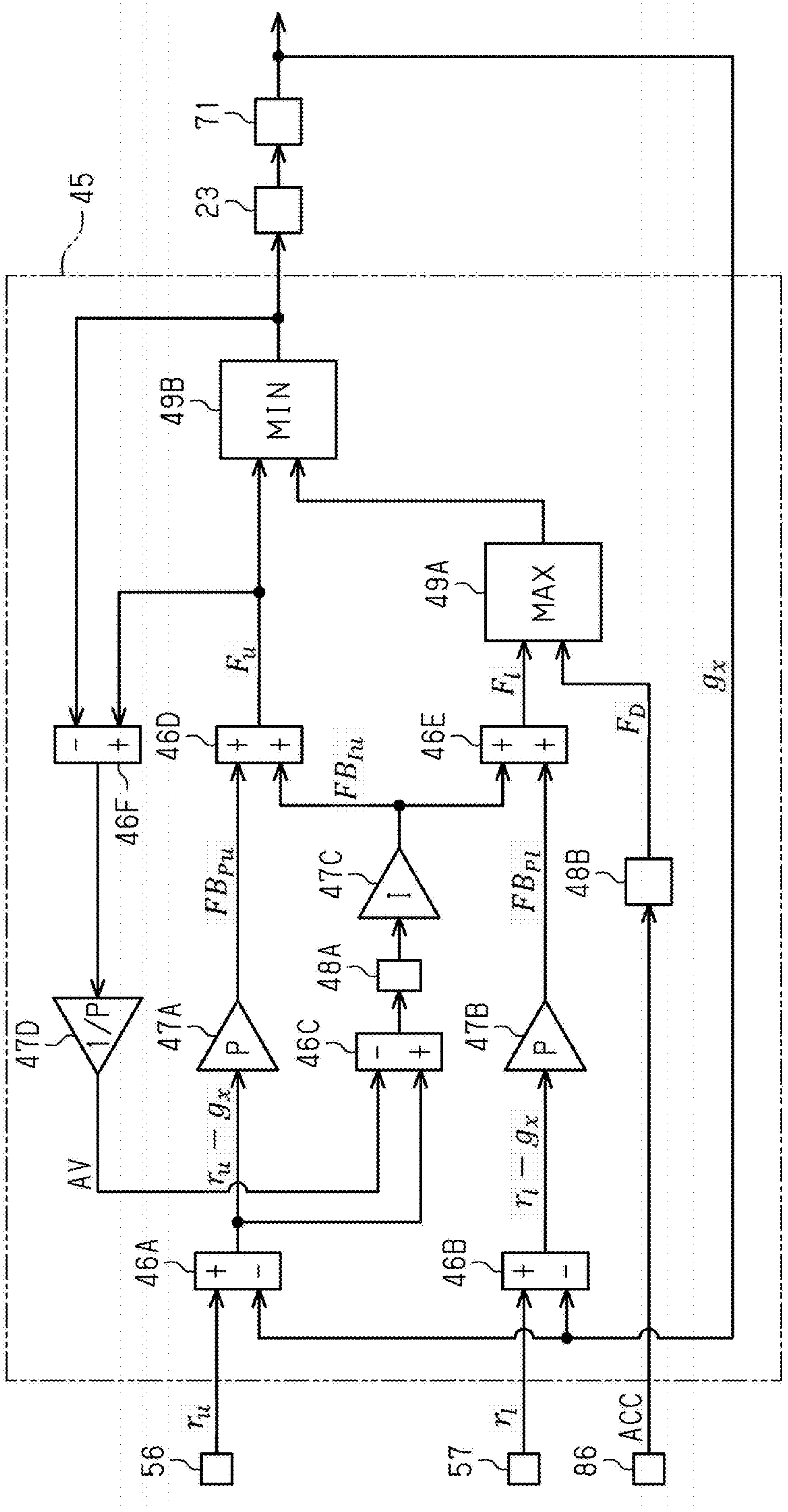
FIG. 3 is a functional block diagram of the motion manager shown in FIG. 2 related to arbitration control.

As shown in FIG. 3, the motion manager 45 includes various computing units as functional blocks. To be more specific, the motion manager 45 includes a first computing unit 46A to a sixth computing unit 46F. The motion manager 45 includes a first multiplier 47A to a fourth multiplier 47D. The motion manager 45 comprises an integrator 48A and a converter 48B. The motion manager 45 includes a first arbiter 49A and a second arbiter 49B. The first computing unit 46A obtains the first assistance acceleration $r_u$ from the first assistance unit 56. As described above, the first assistance acceleration $r_u$ is a requested value of the acceleration along the longitudinal axis of the vehicle 100. The first computing unit 46A obtains the longitudinal acceleration $g_x$.

The first computing unit 46A subtracts the longitudinal acceleration $g_x$ from the first assistance acceleration $r_u$.

The first multiplier 47A obtains the value calculated by the first computing unit 46A. The first multiplier 47A calculates, as the first intermediate value $FB_{Pu}$, a value obtained by multiplying the value calculated by the first computing unit 46A by a predetermined coefficient P. The coefficient P is a value determined in advance by an experiment, a simulation, or the like. The coefficient P is a positive value.

The second computing unit 46B obtains the second assistance acceleration $r_l$ from the second assistance unit 57. As described above, the second assistance acceleration $r_l$ is a requested value of acceleration along the front-rear axis, or the longitudinal axis, of the vehicle 100. The second computing unit 46B obtains the longitudinal acceleration $g_x$. The second computing unit 46B subtracts the longitudinal acceleration $g_x$ from the second assistance acceleration $r_l$.

The second multiplier 47B obtains the value calculated by the second computing unit 46B. The second multiplier 47B calculates, as the second intermediate value $FB_{Pl}$, a value obtained by multiplying the value calculated by the second computing unit 46B by a predetermined coefficient P. The coefficient P used by the second multiplier 47B is the same as the coefficient P used by the first multiplier 47A.

The third computing unit 46C obtains the value calculated by the first computing unit 46A. The third computing unit 46C obtains the adjustment value AV that has been calculated by the fourth multiplier 47D. The third computing unit 46C subtracts the adjustment value AV calculated by the fourth multiplier 47D from the value calculated by the first computing unit 46A. That is, the third computing unit 46C subtracts the adjustment value AV from the difference between the first assistance acceleration $r_u$ and the longitudinal acceleration $g_x$. The fourth multiplier 47D will be described later.

The integrator 48A obtains the value calculated by the third computing unit 46C. The integrator 48A accumulates the value calculated by the third computing unit 46C. That is, the integrator 48A calculates an integrated value based on the two values obtained by the third computing unit 46C.

The third multiplier 47C obtains the value calculated by the integrator 48A. The third multiplier 47C calculates, as the third intermediate value $FB_{Iu}$, a value obtained by multiplying the value calculated by the integrator 48A by a predetermined coefficient I. The coefficient I is a value determined in advance by experiments, simulations, and the like. The coefficient I is a positive value.

The fourth computing unit 46D obtains a first intermediate value $FB_{Pu}$. The fourth computing unit 46D obtains the third intermediate value $FB_{Iu}$. The fourth computing unit 46D calculates a value obtained by adding the first intermediate value $FB_{Pu}$ and the third intermediate value $FB_{Iu}$ as the first assistance instruction value $F_u$. Therefore, the motion manager 45 calculates the first assistance instruction value $F_u$ by correcting the first assistance acceleration $r_u$. In the present embodiment, the first assistance instruction value $F_u$ is an example of the corrected acceleration or the second corrected acceleration. In the PI control, the motion manager 45 calculates the adjustment value AV as described later, and performs feedback control based on a value obtained by accumulating a value obtained by subtracting the adjustment value AV from the difference between the first assistance acceleration $r_u$ and the longitudinal acceleration $g_x$. Therefore, the motion manager 45 calculates the first assistance instruction value $F_u$ which is the corrected acceleration.

The fifth computing unit 46E obtains the second intermediate value $FB_{Pl}$. The fifth computing unit 46E obtains the third intermediate value $FB_{Iu}$. The fifth computing unit 46E calculates a value obtained by adding the second intermediate value $FB_{Pl}$ and the third intermediate value $FB_{Iu}$ as the second assistance instruction value $F_l$. Therefore, the motion manager 45 calculates the second assistance instruction value $F_l$ by correcting the second assistance acceleration $r_l$. In the present embodiment, the second assistance instruction value $F_l$ is an example of a corrected acceleration or a second corrected acceleration.

The converter 48B obtains the accelerator operation amount ACC. The converter 48B calculates an operation instruction value $F_D$ corresponding to the accelerator operation amount ACC. That is, the converter 48B obtains the operation instruction value $F_D$ by calculating the operation instruction value $F_D$ corresponding to the accelerator operation amount ACC. In the present embodiment, the converter 48B calculates the operation instruction value $F_D$ having a larger value as the accelerator operation amount ACC increases. Therefore, the operation instruction value $F_D$ is a value having a positive correlation with the accelerator operation amount ACC. The dimension of the operation instruction value $F_D$ is the same as the dimension of the first assistance instruction value $F_u$ and as the dimension of the second assistance instruction value $F_l$. In other words, the operation instruction value $F_D$ indicates a requested value of the acceleration along the longitudinal axis of the vehicle 100. The operation instruction value $F_D$ is an example of a first requested acceleration.

The first arbiter 49A obtains the second assistance instruction value $F_l$. The first arbiter 49A obtains the operation instruction value $F_D$. The first arbiter 49A selects the larger value of the second assistance instruction value $F_l$ and the operation instruction value $F_D$.

The second arbiter 49B obtains the first assistance instruction value $F_u$. The second arbiter 49B obtains the value selected by the first arbiter 49A. The second arbiter 49B selects the smallest value of the first assistance instruction value $F_u$ and the value selected by the first arbiter 49A. Therefore, the first arbiter 49A and the second arbiter 49B select any one of the first assistance instruction value $F_u$, the second assistance instruction value $F_l$, and the operation instruction value $F_D$ as the arbitration result. Further, the second arbiter 49B outputs the arbitration result to the power train control unit 23. At this time, the power train control unit 23 calculates the controlled variable of the power train device 71 in accordance with the arbitration result from the second arbiter 49B. The power train control unit 23 outputs a control signal corresponding to the calculated controlled variable to the power train device 71. As a result, the longitudinal acceleration $g_x$, which is the actual acceleration of the vehicle 100, can be changed by controlling the power train device 71.

The sixth computing unit 46F obtains the first assistance instruction value $F_u$. The sixth computing unit 46F obtains the arbitration result of the second arbiter 49B. In other words, the sixth computing unit 46F obtains the value selected by the second arbiter 49B as the arbitration result. The sixth computing unit 46F subtracts the value selected as the arbitration result by the second arbiter 49B from the first assistance instruction value $F_u$.

The fourth multiplier 47D obtains the value calculated by the sixth computing unit 46F. The fourth multiplier 47D calculates the adjustment value AV by dividing the value calculated by the sixth computing unit 46F by a predetermined coefficient P. That is, the adjustment value AV is a value obtained by dividing the difference between the first assistance instruction value $F_u$ and the arbitration result by the predetermined coefficient P. The first assistance instruction value $F_u$ is a corrected acceleration. The coefficient P used by the fourth multiplier 47D is the same as the coefficient P used by each of the first multiplier 47A and the second multiplier 47B. As described above, the adjustment value AV calculated by the fourth multiplier 47D is obtained by the third computing unit 46C.

Operation by Arbitration Control

Next, the operation by the arbitration control will be described with reference to FIG. 3.

First, a case where the first assistance instruction value $F_u$ has been selected as the arbitration result will be described. In this case, the first assistance instruction value $F_u$ is expressed by the following expression (1).

Expression 1

$$F_u = P(r_u - g_x) + \int I(r_u - g_x)\,dt \tag{1}$$

When the first assistance instruction value $F_u$ has been selected as the arbitration result as in the above expression (1), the first assistance instruction value $F_u$ is the same as the value calculated in a general PI control. That is, the first assistance instruction value $F_u$ is the same as the value calculated by the feedback control based on the difference between the first assistance acceleration $r_u$ and the longitudinal acceleration $g_x$, and the integrated value of the difference.

When the first assistance instruction value $F_u$ has been selected as the arbitration result as described above, the second assistance instruction value $F_l$ is expressed by the following expression (2).

Expression 2

$$F_l = P(r_l - g_x) + \int I(r_u - g_x)\,dt \tag{2}$$

The second term of the second assistance instruction value $F_l$ in Expression (2) is the same as the second term of the first assistance instruction value $F_u$ in Expression (1).

Next, a case where the second assistance instruction value $F_l$ has been selected as the arbitration result will be described. In this case, the first assistance instruction value $F_u$ is expressed by the following expression (3).

Expression 3

$$\begin{aligned} F_u &= P(r_u - g_x) + \int I(r_u - g_x)dt - \int I\frac{1}{P}(FB_{Pu} + FB_{Iu} - FB_{Pl} - FB_{Iu})dt \\ &= P(r_u - g_x) + \int I(r_u - g_x)dt - \int I\frac{1}{P}\{P(r_u - g_x) - P(r_l - g_x)\}dt \\ &= P(r_u - g_x) + \int I(r_l - g_x)dt \end{aligned} \tag{3}$$

When the second assistance instruction value $F_l$ has been selected as the arbitration result as described above, the second assistance instruction value $F_l$ is expressed by the following expression (4).

Expression 4

$$F_l = P(r_l - g_x) + \int I(r_l - g_x)dt \tag{4}$$

When the second assistance instruction value $F_l$ has been selected as the arbitration result as in the above expression (4), the second assistance instruction value $F_l$ is the same as the value calculated in a general PI control. That is, the second assistance instruction value $F_l$ is the same as the value calculated by the feedback control based on the difference between the second assistance acceleration $r_l$ and the longitudinal acceleration $g_x$, and the integrated value of the difference. The second term of the second assistance instruction value $F_l$ in Expression (4) is the same as the second term of the first assistance instruction value $F_u$ in Expression (3).

Further, a case where the operation instruction value $F_D$ has been selected as the arbitration result will be described. In this case, the first assistance instruction value $F_u$ is expressed by the following expression (5).

Expression 5

$$F_u = P(r_u - g_x) + \int I(r_u - g_x)dt - \int I\frac{1}{P}(FB_{Pu} + FB_{Iu} - F_D)dt \tag{5}$$

When the operation instruction value $F_D$ has been selected as the arbitration result as described above, the second assistance instruction value $F_l$ is expressed by the following expression (6).

Expression 6

$$F_l = P(r_l - g_x) + \int I(r_u - g_x)dt - \int I\frac{1}{P}(FB_{Pu} + FB_{Iu} - F_D)dt \tag{6}$$

As shown in FIG. 3, the first assistance instruction value $F_u$ is the sum of the first intermediate value $FB_{Pu}$ and the third intermediate value $FB_{Iu}$. The second assistance instruction value $F_l$ is the sum of the second intermediate value $FB_{Pl}$ and the third intermediate value $FB_{Iu}$. The second term and the third term of the first assistance instruction value $F_u$ in the expression (5) correspond to the third intermediate value $FB_{Iu}$. Further, the second and third terms of the second assistance instruction value $F_l$ in the expression (6) correspond to the third intermediate value $FB_{Iu}$. Therefore, the second term and the third term of the first assistance instruction value $F_u$ in Expression (5) are the same as the second term and the third term of the second assistance instruction value $F_l$ in Expression (6). Focusing on the second term and the third term of the first assistance instruction value $F_u$ in the expression (5), that is, the third intermediate value $FB_{Iu}$, the third intermediate value $FB_{Iu}$ is expressed by the following expression (7).

Expression 7

$$\begin{aligned} FB_{Iu} &= \int I(r_u - g_x)dt - \int I\frac{1}{P}(FB_{Pu} + FB_{Iu} - FD_D)dt \\ &= \int I\frac{1}{P}(FB_{Iu} - F_D)dt \end{aligned} \tag{7}$$

When both sides of Expression (7) are differentiated by time t, the following Expression (8) is derived.

Expression 8

$$\frac{d}{dt}FB_{Iu} = -I\frac{1}{P}(FB_{Iu} - F_D) \tag{8}$$

The above expression (8) is a differential expression for time t. The value of the third intermediate value $FB_{Iu}$ at time t is represented by $FB_{Iu}(t)$, and an initial value that is the value of the third intermediate value $FB_{Iu}$ when time t is 0 is represented by $FB_{Iu}(0)$. When the differential expression of the above Expression (8) is solved, the following Expression (9) is derived.

Expression 9

$$FB_{IU}(t) = FB_{Iu}(0)e^{-\frac{1}{P}t} + \int_0^t e^{\frac{1}{P}t}\frac{1}{P}F_D dt \tag{9}$$

As shown in the above expression (9), the value $FB_{Iu}(t)$ of the third intermediate value $FB_{Iu}$ at time t is determined depending only on the initial value $FB_{Iu}(0)$ and the operation instruction value $F_D$. In other words, $FB_{Iu}$ (t), which is the value of the third intermediate value $FB_{Iu}$ at time t, is determined regardless of the first assistance acceleration $r_u$, the second assistance acceleration $r_l$, or the longitudinal acceleration $g_x$.

Therefore, when the operation instruction value $F_D$ has been selected as the arbitration result, the second term and the third term of the first assistance instruction value $F_u$ in the expression (5), that is, the third intermediate value $FB_{Iu}$ is prevented from varying. Contrary to this, an integrated value calculated in a general PI control would vary. The first assistance instruction value $F_u$ is calculated such that the absolute value of the difference between the first assistance instruction value $F_u$ and the operation instruction value $F_D$ is small. That is, the absolute value of the difference between the operation instruction value $F_D$ selected as the arbitration result and the calculated first assistance instruction value $F_u$ is smaller than the absolute value of the difference between the selected operation instruction value $F_D$ and the first assistance instruction value $F_u$ obtained when the selected operation instruction value $F_D$ is obtained. In other words, when the operation instruction value $F_D$ has been selected as the arbitration result, the motion manager 45 calculates the first assistance instruction value $F_u$ such that the first assistance instruction value $F_u$ is closer to the selected operation instruction value $F_D$ than the first assistance instruction value $F_u$ obtained when the selected operation instruction value $F_D$ is obtained. At this time, the operation instruction value $F_D$ corresponds to the first requested acceleration. The first assistance acceleration $r_u$ corresponds to a second requested acceleration. Further, the first assistance instruction value $F_u$ corresponds to the corrected acceleration or the second corrected acceleration.

Similarly to the above, when the operation instruction value $F_D$ has been selected as the arbitration result, the second term and the third term of the second assistance instruction value $F_l$ in the expression (6), that is, the third intermediate value $FB_{Iu}$ is prevented from varying. Contrary to this, an integrated value calculated in a general PI control would vary. The second assistance instruction value $F_l$ is calculated such that the absolute value of the difference between the second assistance instruction value $F_l$ and the operation instruction value $F_D$ is small. That is, the absolute value of the difference between the operation instruction value $F_D$ selected as the arbitration result and the calculated second assistance instruction value $F_l$ is smaller than the absolute value of the difference between the selected operation instruction value $F_D$ and the second assistance instruction value $F_l$ obtained when the selected operation instruction value $F_D$ is obtained. In other words, when the operation instruction value $F_D$ has been selected as the arbitration result, the motion manager 45 calculates the second assistance instruction value $F_l$ such that the second assistance instruction value $F_l$ is closer to the selected operation instruction value $F_D$ than the second assistance instruction value $F_l$ obtained when the selected operation instruction value $F_D$ is obtained. At this time, the operation instruction value $F_D$ corresponds to the first requested acceleration. The second assistance acceleration $r_l$ corresponds to a second requested acceleration. Further, the second assistance instruction value $F_l$ corresponds to the corrected acceleration or the second corrected acceleration.

Operation of Present Embodiment

First, a comparative example will be described. It is assumed that the motion manager 45 of the comparative example receives the second assistance acceleration $r_l$ from the second assistance unit 57 and the accelerator operation amount ACC from the driver of the vehicle 100. In part (a) of FIG. 5, a long-dash double-short-dash line indicates the second assistance acceleration $r_l$. The second assistance acceleration $r_l$ extends horizontally straight in part (a) of FIG. 5. The long-dash short-dash line indicates the operation acceleration $r_D$. In part (a) of FIG. 5, the operation acceleration $r_D$ increases at time t11 and then decreases at time t12. In part (a) of FIG. 5, the operation acceleration $r_D$ is obtained by converting the accelerator operation amount ACC such that the dimension of the operation acceleration $r_D$ is the same as the dimension of the second assistance acceleration $r_l$. In part (a) of FIG. 5, the solid line indicates the longitudinal acceleration $g_x$ which is the actual acceleration of the vehicle 100.

In part (b) of FIG. 5, a long-dash double-short-dash line indicates the second assistance instruction value $F_l$. In part (b) of FIG. 5, the second assistance instruction value $F_l$ extends horizontally and straight until time t12. The long-dash short-dash line indicates the operation instruction value $F_D$. In part (b) of FIG. 5, the operation instruction value $F_D$ increases at time t11 and then decreases at time t12. In part (b) of FIG. 5, the solid line indicates the arbitration result Z by the motion manager 45.

As shown in part (a) of FIG. 5, after time t11, more specifically, between time t11 and time t12, the operation acceleration ID (indicated by the long-dash short-dash line), which has been converted form the accelerator operation amount ACC, is larger than the second assistance acceleration $r_l$ indicated by the long-dash double-short-dash line. Then, as shown in part (b) of FIG. 5, the operation instruction value $F_D$ calculated from the accelerator operation amount ACC and indicated by the long-dash short-dash line is larger than the second assistance instruction value $F_l$ calculated from the second assistance acceleration $r_l$ and indicated by the long-dash double-short-dash line. Therefore, between time t11 and time t12 in part (b) of FIG. 5, the motion manager 45 selects the operation instruction value $F_D$ calculated from the accelerator operation amount ACC as the arbitration result Z indicated by the solid line. The operation instruction value $F_D$ is selected as the arbitration result Z because the operation instruction value $F_D$ is larger than the second assistance instruction value $F_I$ (the first arbiter 49A). As a result, as shown in part (a) of FIG. 5, the longitudinal acceleration $g_x$ (indicated by the solid line), which is the actual acceleration of the vehicle 100, approaches the operation acceleration $r_D$ (indicated by the long-dash short-dash line), which corresponds to the accelerator operation amount ACC, as time elapses from time t11. In the comparative example, the operation instruction value $F_D$ has been selected as the arbitration result Z between time t11 and time t12. Thus, between time t11 and time t12, the execution of the feedback control using the second assistance acceleration $r_I$ corresponding to the second assistance instruction values $F_I$ not selected as the arbitration result Z is stopped. That is, the so-called PI control is stopped. The PI control is based on a difference between the second assistance acceleration $r_I$ and the longitudinal acceleration $g_x$, and an integrated value of the difference. As a result, as shown between time t11 and time t12 in part (b) of FIG. 5, the second assistance instruction value $F_I$, which has been calculated from the second assistance acceleration $r_I$ and is indicated by the long-dash double-short-dash line, is maintained at a fixed value.

At time t12 after time t11 in part (a) of FIG. 5, the operation acceleration $r_D$ (indicated by the long-dash short-dash line) which has been obtained by converting the accelerator operation amount ACC, is smaller than the second assistance acceleration $r_I$. Then, as shown in part (b) of FIG. 5 after time t12, the operation command value $F_D$ calculated from the accelerator operation amount ACC and indicated by the long-dash short-dash line is smaller than the second assistance instruction value $F_I$ calculated from the second assistance acceleration $r_I$. The second assistance instruction value $F_I$ is indicated by the long-dash double-short-dash line. Therefore, as shown in part (b) of FIG. 5 after time t12, the motion manager 45 selects, as the arbitration result Z shown by the solid line, the second assistance instruction value $F_I$ shown by the long-dash double-short-dash line which has been calculated from the second assistance acceleration $r_I$. In the comparative example, since the second assistance instruction value $F_I$ has been selected as the arbitration result Z after time t12, the execution of the feedback control using the second assistance acceleration $r_I$ corresponding to the second assistance instruction value $F_I$ is resumed. That is, the execution of the so-called PI control is resumed. The PI control is based on a difference between the second assistance acceleration $r_I$ and the longitudinal acceleration $g_x$, and an integrated value of the difference. Before time t12, a period in which the absolute values of the differences between the second assistance acceleration $r_I$ and the longitudinal acceleration $g_x$ are large continues. Therefore, the integrated value in the PI control becomes excessively large. As a result, despite the fact that the second assistance acceleration $r_I$ has not changed, the second assistance instruction value $F_I$, indicated by the long-dash double-short-dash line in part (b) of FIG. 5, abruptly decreases at time t12. As a result, in part (a) of FIG. 5, the longitudinal acceleration $g_x$ indicated by the solid line, which are the actual acceleration of the vehicle 100, also abruptly decrease immediately after time t12.

Next, the present embodiment will be described. Similarly to the above, in part (a) of FIG. 4, at time t11, the operation acceleration $r_D$ indicated by the long-dash short-dash line obtained by converting the accelerator operation amount ACC becomes larger than the second assistance acceleration $r_I$ indicated by the long-dash double-short-dash line. Then, as shown between time t11 and time t12 in part (b) of FIG. 4, the operation instruction value $F_D$ (indicated by the long-dash short-dash line), which has been calculated from the accelerator operation amount ACC, is larger than the second assistance instruction value $F_I$ (indicated by the long-dash double-short-dash line), which has been calculated from the second assistance acceleration $r_I$. Therefore, as shown between time t11 and time t12 in part (b) of FIG. 4, the motion manager 45 selects the operation instruction value $F_D$, which has been calculated from the accelerator operation amount ACC and is indicated by the long-dash short-dash line, as the arbitration result Z indicated by the solid line. As a result, as shown between time t11 and time t12 in part (a) of FIG. 4, the longitudinal acceleration $g_x$ indicated by the solid line approaches the operation acceleration $r_D$ indicated by the long-dash short-dash line indicating the accelerator operation amount ACC. Since the operation instruction value $F_D$ has been selected as the arbitration result, the motion manager 45 calculates the second assistance instruction value $F_I$ such that the second assistance instruction value $F_I$ is closer to the selected operation instruction value $F_D$ than the second assistance instruction value $F_I$ obtained when the selected operation instruction value $F_D$ is obtained. Namely, the second assistance instruction value $F_I$ in the period after time t11 to time t12 is larger than the second assistance instruction value $F_I$ at time t11. In other words, the difference between the second assistance instruction value $F_I$ and the operation instruction value $F_D$ in the period after time t11 to time t12 is smaller than the difference between the second assistance instruction value $F_I$ and the operation instruction value $F_D$ at time t11. Therefore, for example, as compared with the configuration in which the second assistance instruction value $F_I$ is maintained at a fixed value when the operation instruction value $F_D$ has been selected as the arbitration result between time t11 and time t12 as in the comparative example, the present embodiment has the following difference. That is, between time t11 and time t12 in part (b) of FIG. 4, the absolute value of the difference between the operation instruction values $F_D$ (indicated by the long-dash short-dash line) and the second assistance instruction values $F_I$ (indicated by the long-dash double-short-dash line) is smaller than the absolute value of the difference between the operation instruction values $F_D$ and the second assistance instruction values $F_I$ shown in part (b) of FIG. 5.

As shown at time t12 after time t11 in part (a) of FIG. 4, the operation acceleration $r_D$ indicated by the long-dash short-dash line obtained by converting the accelerator operation amount ACC is smaller than the second assistance acceleration $r_I$ indicated by the long-dash double-short-dash line. Then, as shown at time t12 in part (b) of FIG. 4, the operation instruction value $F_D$ (indicated by the long-dash short-dash line), which has been calculated from the accelerator operation amount ACC, is smaller than the second assistance instruction value $F_I$ (indicated by the long-dash double-short-dash line), which has been calculated from the second assistance acceleration $r_I$. Therefore, as shown in part (b) of FIG. 4 after time t12, the motion manager 45 selects the second assistance instruction value $F_I$, which has been calculated from the second assistance acceleration $r_I$ and is indicated by the long-dash double-short-dash line, as the arbitration result Z indicated by the solid line. Before time t12, the absolute values of the differences between the operation instruction values $F_D$ and the second assistance instruction values $F_I$ are relatively small, and thus the integrated values in the PI control are also relatively small. Therefore, for example, as compared with the configuration in which the second assistance instruction value $F_l$ is maintained at a constant value when the operation instruction value $F_D$ has been selected as the arbitration result Z as in the comparative example as shown in part (b) of FIG. 5, the present embodiment is improved as follows. That is, in the present embodiment, when the arbitration result Z is switched from the operation instruction value Fp to the second assistance instruction value $F_l$ at time t12, an abrupt change in the second assistance instruction value $F_l$ is prevented.

Advantages of Present Embodiment (1) According to the present embodiment, as shown in part (b) of FIG. 4, an abrupt change in the second assistance instruction value $F_l$ indicated by the long-dash double-short-dash line at time t12 is suppressed. Therefore, an abrupt change in the controlled variable of the power train device 71 calculated by the power train control unit 23 is suppressed. As a result, even when the arbitration result Z is switched from the operation instruction value $F_D$ to the second assistance instruction value $F_l$ at time t12, the longitudinal acceleration $g_x$ (indicated by the solid line), which is the actual acceleration of the vehicle 100, is prevented from changing abruptly at time t12. The longitudinal acceleration $g_x$ is shown in part (a) of FIG. 4.

(2) As described above, after time t11 and before time t12, the operation instruction value $F_D$ calculated from the accelerator operation amount ACC is selected as the arbitration result Z. At this time, a period in which the absolute value of the difference between the second assistance acceleration $r_l$ and the longitudinal acceleration $g_x$ is large continues. Therefore, if the feedback control based on the integrated value of the difference between the second assistance acceleration $r_l$ and the longitudinal acceleration $g_x$ is simply performed, the integrated value of the feedback control tends to become excessively large due to the continuation of the above-described period. In this case, the absolute value of the difference between the second assistance instruction value $F_l$ and the operation instruction value $F_D$ may become excessively large due to an excessive change in the second assistance instruction value $F_l$ calculated from the second assistance acceleration $r_l$.

In this regard, according to the present embodiment, when the operation instruction value $F_D$ has been selected as the arbitration result, the motion manager 45 calculates the second assistance instruction value $F_l$ so as to be closer to the selected operation instruction value $F_D$ than the second assistance instruction value $F_l$ obtained when the selected operation instruction value $F_D$ is obtained. Therefore, the absolute value of the difference between the second assistance instruction value $F_l$ and the operation instruction value $F_D$ is prevented from becoming excessively large. Therefore, it is particularly preferable to use the present technology for a configuration in which feedback control is performed.

(3) Generally, the accelerator operation amount ACC is likely to fluctuate. Therefore, the absolute value of the difference between the operation instruction value $F_D$ calculated from the accelerator operation amount ACC and the second assistance instruction value $F_l$ calculated from the second assistance acceleration $r_l$ tends to be large. As a result, when the arbitration result Z is switched from the operation instruction value $F_D$ to the second assistance instruction value $F_l$ at time t12, the absolute value of the difference between the operation instruction value $F_D$ and the second assistance instruction value $F_l$ may be excessively large.

In this regard, according to the present embodiment, when the operation instruction value $F_D$ has been selected as the arbitration result, the motion manager 45 calculates the second assistance instruction value $F_l$ such that the second assistance instruction value $F_l$ is closer to the selected operation instruction value $F_D$ than the second assistance instruction value $F_l$ obtained when the selected operation instruction value $F_D$ is obtained. In other words, the absolute value of the difference between the operation instruction value $F_D$ selected as the arbitration result and the calculated second assistance instruction value $F_l$ is smaller than the absolute value of the difference between the selected operation instruction value $F_D$ and the second assistance instruction value $F_l$ obtained when the selected operation instruction value $F_D$ is obtained. Thus, when the arbitration result Z is switched from the operation instruction value $F_D$ to the second assistance instruction value $F_l$ at time t12, the absolute value of the difference between the operation instruction value $F_D$ and the second assistance instruction value $F_l$ is unlikely to be excessively large. Therefore, it is particularly preferable to use the present technology when the operation instruction value $F_D$ calculated from the accelerator operation amount ACC has been selected as the arbitration result.

(4) In the present embodiment, the fourth computing unit 46D obtains the third intermediate value $FB_{Iu}$ calculated by the third multiplier 47C. The fourth computing unit 46D calculates a value obtained by adding the first intermediate value $FB_{Pu}$ and the third intermediate value $FB_{Iu}$ as the first assistance instruction value $F_u$. Similarly to the fourth computing unit 46D, the fifth computing unit 46E obtains the third intermediate value $FB_{Iu}$ calculated by the third multiplier 47C. The fifth computing unit 46E calculates a value obtained by adding the second intermediate value $FB_{Pl}$ and the third intermediate value $FB_{Iu}$ as the second assistance instruction value $F_l$. In other words, in the PI control, the motion manager 45 calculates the first assistance instruction value $F_u$ by performing feedback control based on a value obtained by accumulating (48A) a value obtained by subtracting (46C) the adjustment value AV from the difference (46A) between the first assistance acceleration $r_u$ and the longitudinal acceleration $g_x$. The first assistance instruction value $F_u$ is a corrected acceleration. Similarly, the motion manager 45 calculates a second assistance instruction value $F_l$ which is a corrected acceleration. The sixth computing unit 46F, the fourth multiplier 47D, the third computing unit 46C, the integrator 48A, and the third multiplier 47C calculate the adjustment value AV and perform subtraction and accumulation using the adjustment value AV. Therefore, the motion manager 45 does not need to additionally include the same or similar configuration in the sixth computing unit 46F, the fourth multiplier 47D, the third computing unit 46C, the integrator 48A, and the third multiplier 47C in order to calculate the second assistance instruction value $F_l$, which is a corrected acceleration. Therefore, the configuration of the motion manager 45 can be simplified. That is, as will be understood from the description of the operation by the arbitration control, it is not necessary to provide two sets of components from the sixth computing unit 46F to the integrator 48A. In the present embodiment, for example, the second assistance instruction value $F_l$, which is a corrected acceleration, can be calculated in the same manner as in the case in which two sets of the components from the sixth computing unit 46F to the integrator 48A are provided.

Modifications

The above-described embodiment may be modified as follows. The above-described embodiment and the following modifications can be combined as long as the combined modifications remain technically consistent with each other.

In the above embodiment, the arbitration control may be changed.

For example, the way of arbitration performed by the first arbiter 49A and the second arbiter 49B may be changed. As a concrete example, the first arbiter 49A and the second arbiter 49B may select, as the arbitration result, the largest value of the first assistance instruction value $F_u$, the second assistance instruction value $F_l$, and the operation instruction value $F_D$. As a concrete example, the first arbiter 49A and the second arbiter 49B may select the smallest value of the first assistance instruction value $F_u$, the second assistance instruction value $F_l$, and the operation instruction value $F_D$ as the arbitration result. As a concrete example, the first arbiter 49A and the second arbiter 49B may select the arbitration result after converting the first assistance instruction value $F_u$, the second assistance instruction value $F_l$, and the operation instruction value $F_D$ into values of other dimensions. An example of a value of another dimension is a driving force. As a concrete example, one arbiter may perform arbitration in place of the first arbiter 49A and the second arbiter 49B.

For example, the motion manager 45 may perform arbitration control for other devices. As a specific example, the motion manager 45 may execute arbitration control for the brake device 73. In this case, the motion manager 45 may receive the brake operation amount BRA instead of the accelerator operation amount ACC. As a specific example, the motion manager 45 may execute arbitration control for the steering device 72. In this case, the motion manager 45 may receive the steering angle RA instead of the accelerator operation amount ACC. The motion manager 45 may receive the requested value of the acceleration along the lateral axis of the vehicle 100 from the first assistance unit 56 or the like. Further, the motion manager 45 may obtain the lateral acceleration $g_y$ instead of the longitudinal acceleration $g_x$. That is, the present technology can also be applied to arbitration control for other accelerations.

For example, the types of the first requested acceleration and the second requested acceleration may be changed. As a specific example, the first requested acceleration may be a requested value of acceleration from the application software. As a specific example, the first requested acceleration may be a requested value of the driving force from the application software. That is, the first requested acceleration can be changed as long as it is a value having a positive correlation with the requested acceleration of the vehicle 100. The second requested acceleration can be changed in the same manner as the first requested acceleration.

For example, the feedback control performed by the motion manager 45 may be changed. As a concrete example, the motion manager 45 may include not only the sixth computing unit 46F, the fourth multiplier 47D, the third computing unit 46C, the integrator 48A, and the third multiplier 47C, but also the same or similar configuration as described above in order to calculate the second assistance instruction value $F_l$, which is the corrected acceleration. As a specific example, the motion manager 45 may execute so-called PID control instead of the PI control.

For example, the motion manager 45 may omit feedback control. As a specific example, from the viewpoint of suppressing only an abrupt change in the actual acceleration of the vehicle 100 when the arbitration result is switched, the feedback control can be omitted.

In the above embodiment, the configuration of the vehicle 100 may be changed.

For example, the ECU that realizes the function of the motion manager 45 may be other than the brake ECU 40. As a concrete example, instead of the brake ECU 40, the execution device 11 of the central ECU 10 may realize the function of the motion manager 45 by executing the motion manager application 45A stored in the storage device 12. That is, a central ECU 10, a power train ECU 20, a steering ECU 30, a brake ECU 40, and an advanced driver-assistance ECU 50 may be employed as the information processing device.

The information processing device is not limited to various ECUs. For example, the information processing device may include a dedicated hardware circuit such as an application specific integrated circuit (ASIC) that performs hardware processing on at least a part of the software processing in the above-described embodiment. That is, the information processing device may have any one of the following configurations (a) A processor that executes all of the above processes in accordance with a program and a program storage device (including a non-transitory computer-readable storage medium) such as a ROM that stores the program are provided. (b) a processor and a program storage device for executing a part of the processing in accordance with a program, and a dedicated hardware circuit for executing the remaining processing. (c) A configuration including a dedicated hardware circuit that executes all of the above-described processes. The number of software execution devices each including a processor and a program storage device or the number of dedicated hardware circuits may be one or any plural number.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processing device mounted in a vehicle, comprising processing circuitry including a processor and a memory storing instructions that, when executed by the processor, cause the processing circuitry to:

obtain a first requested acceleration of the vehicle;

obtain a second requested acceleration different from the first requested acceleration;

obtain an actual acceleration of the vehicle from an acceleration sensor;

calculate a difference signal representing a difference between the second requested acceleration and the actual acceleration;

calculate an adjustment value by dividing a difference between (i) a corrected acceleration and (ii) an arbitration result by a predetermined coefficient;

generate an integration input value by subtracting the adjustment value from the difference signal;

accumulate the integration input value to generate an integrated value;

calculate the corrected acceleration using proportional-integral (PI) control including:

(i) a proportional term based on the difference signal, and
(ii) an integral term based on the integrated value:
select one of the first requested acceleration and the corrected acceleration as the arbitration result; and
output the arbitration result to a control circuit that drives an actuator of the vehicle to control vehicle acceleration,
wherein, when the first requested acceleration is selected as the arbitration result at a time of calculating corrected acceleration, the processing circuitry calculates the corrected acceleration such that an absolute difference between the corrected acceleration and the selected first requested acceleration is reduced relative to a case in which the first requested acceleration is not selected, thereby suppressing abrupt changes in vehicle acceleration when switching the arbitration result.

2. The information processing device according to claim 1, wherein the first requested acceleration has a positive correlation with an operation amount of a pedal operated by a driver of the vehicle.

3. The information processing device according to claim 1, wherein the processing circuitry includes an integrator configured to accumulate the integration input value.

4. The information processing device according to claim 1, wherein the integral term is calculated by multiplying the integrated value by a predetermined integral coefficient.

5. The information processing device according to claim 1, wherein the predetermined coefficient used to calculate the adjustment value is the same coefficient used to calculate the proportional term.

6. The information processing device according to claim 1, wherein the predetermined coefficient is a proportional coefficient and is a positive value determined in advance based on an experiment or a simulation.

7. The information processing device according to claim 1, wherein the control circuit includes a power train electronic control unit (ECU) configured to control a power train device in accordance with the arbitration result.

8. The information processing device according to claim 1, wherein the processing circuitry executes a motion manager application stored in a storage device.

9. The information processing device according to claim 8, wherein the information processing device is a brake electronic control unit (ECU).

10. The information processing device according to claim 1, wherein the first requested acceleration is an operation instruction value corresponding to an accelerator operation amount of an accelerator pedal operated by a driver.

11. The information processing device according to claim 10, wherein the operation instruction value increases as the accelerator operation amount increases.

12. The information processing device according to claim 1, wherein the second requested acceleration is obtained from an advanced driver-assistance electronic control unit (ECU).

13. The information processing device according to claim 12, wherein the advanced driver-assistance ECU executes at least one of a speed limiter application and an adaptive cruise control application.

14. The information processing device according to claim 1, wherein the actual acceleration is a longitudinal acceleration of the vehicle.

15. The information processing device according to claim 14, wherein the acceleration sensor is a three-axis sensor configured to detect longitudinal, lateral, and vertical accelerations.

16. The information processing device according to claim 1, wherein the actuator includes at least one of a power train device, a steering device, and a brake device.

17. The information processing device according to claim 1, wherein the memory storing the instructions is a non-transitory computer-readable storage medium.

18. A non-transitory computer-readable storage medium storing a program that, when executed by a processor of an information processing device mounted in a vehicle, causes the processor to:
obtain a first requested acceleration of the vehicle;
obtain a second requested acceleration different from the first requested acceleration;
obtain an actual acceleration of the vehicle from an acceleration sensor;
calculate a difference signal representing a difference between the second requested acceleration and the actual acceleration;
calculate an adjustment value by dividing a difference between (i) a corrected acceleration and (ii) an arbitration result by a predetermined coefficient;
generate an integration input value by subtracting the adjustment value from the difference signal;
accumulate the integration input value to generate an integrated value;
calculate the corrected acceleration using proportional-integral (PI) control including:
(i) a proportional term based on the difference signal, and
(ii) an integral term based on the integrated value;
select one of the first requested acceleration and the corrected acceleration as the arbitration result; and
output the arbitration result to a control circuit that drives an actuator of the vehicle to control vehicle acceleration,
wherein, when the first requested acceleration is selected as the arbitration result at a time of calculating the corrected acceleration, the corrected acceleration is calculated so as to reduce an absolute difference between the corrected acceleration and the selected first requested acceleration relative to a case in which the first requested acceleration is not selected, thereby suppressing abrupt changes in vehicle acceleration when switching the arbitration result.

19. An information processing method executed by processing circuitry of an information processing device mounted in a vehicle, the information processing method comprising:
obtaining a first requested acceleration of the vehicle;
obtaining a second requested acceleration different from the first requested acceleration;
obtaining an actual acceleration of the vehicle from an acceleration sensor;
calculating a difference signal between the second requested acceleration and the actual acceleration;
calculating an adjustment value by dividing a difference between a corrected acceleration and an arbitration result by a predetermined coefficient;
generating an integration input value by subtracting the adjustment value from the difference signal;
accumulating the integration input value to generate an integrated value;
calculating the corrected acceleration using proportional-integral control including:
(i) a proportional term based on the difference signal, and
(ii) an integral term based on the integrated value;
selecting one of the first requested acceleration and the corrected acceleration as an arbitration result; and outputting the arbitration result to a control circuit that drives an actuator of the vehicle to control vehicle acceleration, wherein, when the first requested acceleration is selected as the arbitration result at a time of calculating the corrected acceleration, the corrected acceleration is calculated such that an absolute difference between the corrected acceleration and the selected first requested acceleration is reduced relative to a case in which the first requested acceleration is not selected, thereby suppressing abrupt changes in vehicle acceleration when switching the arbitration result.

* * * * *